United States Patent

Yamazaki

[15] 3,652,331

[45] Mar. 28, 1972

[54] PROCESS FOR FORMING A FILM ON THE SURFACE OF A SUBSTRATE BY A GAS PHASE

[72] Inventor: Shumpei Yamazaki, 20, 7, 1-chome, Shinkawa, Shizuoka, Japan

[22] Filed: Mar. 13, 1969

[21] Appl. No.: 806,851

[30] Foreign Application Priority Data

Mar. 22, 1968 Japan....................................43/18611
Oct. 3, 1968 Japan....................................43/71972

[52] U.S. Cl.............................117/201, 117/106 A, 117/229
[51] Int. Cl...........................................................C23c 13/04
[58] Field of Search.................23/182; 117/106, 107.2, 229, 117/201; 252/472

[56] References Cited

UNITED STATES PATENTS 2,872,342 2/1959 Nack...............................117/107.2 X
3,345,209 10/1967 Cheroff et al..........................117/106

*Primary Examiner*—Ralph S. Kendall
*Attorney*—Holman & Stern

[57] ABSTRACT

A process for forming a film on the surface of a substrate by a gas phase method in the presence of a catalyst used in the solid state electronics at a predetermined distance from the surface of the substrate on which the film is to be formed and a process for forming a silicon oxide or silicon nitride in the presence of a catalyst selected from the group comprising platinum and the like.

10 Claims, 5 Drawing Figures

INVENTOR
SHUMPEI YAMAZAKI
By Holman, Glascock, Downing & Seebold
ATTORNEYS

INVENTOR
SHUMPEI YAMAZAKI
By Holman, Glascock, Downing & Seebold
ATTORNEYS

PROCESS FOR FORMING A FILM ON THE SURFACE OF A SUBSTRATE BY A GAS PHASE

BACKGROUND OF THE INVENTION

In forming an electrically insulating or semiconductive film on the surface of a solid substrate in the fields of the solid state electronics, the so-called gas phase process has been employed. With the expansion of the field of the electronics as seen in integrated circuits, it is becoming more and more necessary to produce electrically insulating or semiconductive films at a temperature considerably lower than those at which such films have hitherto been produced. In addition, the need exists for increasing physical and electrical fitness of the interface i.e., the fitness of the produced film to the surface of the substrate. According to my research, the misfit at the interface is generally caused by the existence of dangling bonds of silicon or other species. In the case of the preparation of silicon oxide or nitride, the misfits at the interface are presumed to be caused by "an insular cluster," i.e., the silicon lump islands on the silicon oxide or nitride solvent. The conventional film forming process by gas phase growth method is such that a pyrolysis or reaction between reactive gases is induced to take place by heating the substrate and the gases in its vicinity in an electric furnace, as exemplified in the reaction of $3SiH_4 + 4NH_3 = Si_3N_4 + 12H_2$. However, by the conventional film forming process it is difficult to control the degree of the pyrolysis or reaction at a specific area. Furthermore, the area where the pyrolysis or reaction takes place cannot be definitely specified and is only vaguely described such as the area in the vicinity of the surface of the substrate. This is because, both the pyrolysis or reaction stage of the reactive gases and the deposition stage of the decomposed reaction product formed by such a pyrolysis or reaction onto the surface of the substrate to form a film thereon have conventionally been performed simultaneously. As a result, the film formed on the substrate surface contains not only ingredients of the reactive gases which have been perfectly pyrolyzed or have reacted, but also unpyrolyzed or unreacted ingredients. In addition, the physical and electrical fitness of the interface region between the surfaces of the substrate and the formed film is lowered by undesirable surface state density by the dangling bonds and lattice defects (the orientation of atoms being locally irregular) and the insular cluster.

SUMMARY OF THE INVENTION

The present invention relates in its one aspect to a process for forming a film on the surface of a substrate by the use of a catalyst in which a chemical activation of reactive gases is performed at a distance of 1 mm, – 1 m. from the surface of the substrate on which the film is to be formed.

The present invention also relates in its other aspect to the formation of a silicon oxide or silicon nitride film in which, by the use of a catalyst selected from the group comprising platinum and the like, gaseous silicon-containing compounds mixed with nitride gases or oxide gas are perfectly or partially pyrolyzed or caused to react with each other in the presence of hydride-containing gases.

The first aspect of the present invention is to provide in the film production system a solid catalyst which serves to reduce the activation energy for the reaction, whereby the two stages which are essentially necessary in the film forming process can be chemically separated from one another, that is, (1) the activation and decomposition or reaction stage of the reactive gases and (2) the deposition and filming stage of the decomposed or reaction product onto the surface of a substrate can be chemically separately performed instead of simultaneously as in the conventional gas phase process. And in accordance with the first aspect of the novel process, the distance between the catalyst and the surface of the substrate on which the film is to be formed, the temperature of the substrate surface and the area where the catalyst is disposed and the mixing ratios of the reactive gases are respectively suitably adjusted so that the state of the film being formed may be chemically altered so as to impart to the thus formed film with desired properties as a film.

According to the second aspect of the present invention, hydride gases which are a reactive species in a pure reaction are caused to contact with a catalyst selected from the group comprising platinum and the like to activate the chemical bonds, the chemical bonds being substantially surrounded by an inert gas (such as argon gas) or an inactive gas such as nitrogen gas so that the chemical bonds may be maintained in their activated state and thereafter, the chemically activated gases are decomposed or caused to react with each other at a desired area whereby the decomposed or reaction product may be deposited on the surface of a substrate as a film thereon.

According the present invention, there is provided a process for forming a film on the surface of a substrate in the presence of a catalyst or catalysts useful in the electronics industry by a gas phase reaction, characterized in that reactive gases are chemically activated in the presence of a catalyst or catalysts at a distance of 1 mm. – 1 m. from said substrate surface thereby forming a film on the substrate surface.

According to the present invention, there is also provided a gas phase reaction process involving hydrides, characterized in that silicon, nitride and oxide containing gases containing hydride gas are reacted in the presence of a catalyst or catalysts formed of platinum or the like whereby a portion or all of said reactive gases may be easily reacted or decomposed so as to provide silicon oxide or silicon nitride.

The above and other objects and advantages of the present invention will be apparent to those skilled in the art from a reading of the following description in conjunction with the accompanying drawings.

BRIEF DESCRIPTION OF THE DRAWINGS

FIG. 1 is a fragmentary schematic view of a reaction system which is advantageously employed in carrying out the gas phase process according to the present invention wherein

PREFERRED EMBODIMENTS OF THE INVENTION

Figure 1A:
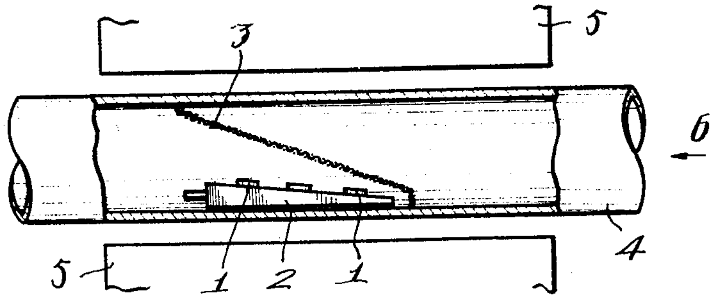
FIG. 1A illustrates an embodiment in which the process was carried out with a catalyst useful in the solid electronics industry disposed in said reaction system at a distance of 1 mm. – 10 cm. from a substrate on the surface of which a film is to be formed

The gas phase process may be generally divided into the gas phase growth process and the gas phase reaction process. The gas phase reaction process may be further subdivided into the gas phase - gas phase reaction and the solid phase - gas phase reaction processes.

The gas phase - gas phase reaction may be illustrated by the following:

1. The formation of a silicon nitride film by a reaction between a member selected from the group comprising monosilane, trichlorosilane and silicon tetrachloride and ammonia or hydrazine.
2. The formation of a silicon oxide by a reaction between one member selected from the group comprising organic silanes such as monosilane and tetraethoxy silane, trichlorosilane and silicon tetrachloride; and one member selected from the group comprising wet oxygen vapor, carbonic acid gas, hydrogen peroxide and nitrogen peroxide.

3. The formation of a beryllium oxide film by a reaction between beryllium chloride or organic beryllium and one member selected from the group comprising oxygen vapor and nitrogen peroxide.

The solid phase - gas phase reaction may be illustrated by the following:

1. The formation of a silicon nitride film by a reaction between a stain film formed on the surface of a silicon substrate (the preparation of the stain film will be described in detail hereinafter in connection with Example 2) and ammonia or hydrazine.
2. The formation of a silicon oxide film by a reaction between a stain film formed on the surface of a silicon substrate and one member selected from the group comprising wet oxygen vapor, hydrogen peroxide, nitrogen peroxide and carbonic acid gas.
3. The formation of a silicon oxide film by a reaction between a cleaned silicon substrate and oxygen vapor.

The gas phase growth process may be divided into the non-crystal film growth process and the crystal film growth process. The former is characterized in that a reaction product synthesized through the gas phase - gas phase reaction is deposited on a desired surface of a desired solid substrate in a piecemeal manner so as to form a film on the substrate surface and the procedure for the non-crystal film growth process is the same as that described in connection with the gas phase film forming process as referred to above.

The crystal film growth process (this process is sometimes referred to as "the epitaxial growth") may be illustrated by the following:

1. The process comprising the steps of vaporizing monosilane on the surface of a single crystal silicon substrate or a sapphire substrate, activating the vapor and decomposing the vapor on the substrate surface or an area adjacent to the substrate surface thereby to cause the thus decomposed or reaction product to grow on the silicon or sapphire substrate.
2. The process comprising the steps of activating one reactive gas such as organic aluminum or aluminum chloride and another reactive gas such as nitrogen peroxide or oxygen, respectively, by means of catalysts, and causing the thus activated two gases to react with each other so as to cause an aluminum oxide film to grow on the surface of a silicon substrate.
3. The process comprising the step of activating or decomposing gallium and arsenic trichloride on the surface of a single crystal gallium - arsenide substrate so as to cause the activated or decomposed materials to grow on the substrate as a film.

In the above-mentioned processes of gas phase reaction or growth, both the activation stage of reactive gases and the decomposition of reaction stage are necessarily involved. In the disclosure of the present invention, the term "activation" refers to the state in which chemical bonds are unstable with respect to energy, the term "decomposition" means the state in which chemical bonds are separated from each other and the term "reaction" means the state in which the separated chemical bonds combine with a different species. According to the present invention, after reactive species have been activated, the reactants are decomposed or caused to react with each other. By this activation stage, the reaction between the different kinds of the species is promoted and the disturbance of the condensation of the same kind of species is accomplished in the synthesized films.

It has been generally recognized that the catalysts to be employed in chemical reactions are composed of non-reactive substances and when the non-reactive catalysts are caused to contact substances which cause chemical reaction to take place, such catalysts slow down or accelerate the reaction speed. However, the solid catalysts to be employed in carrying out the novel process are formed from substances which chemically activate reactive gases while maintaining the chemical bonds of such gases in an unstable state and accelerate the deposition and film formation of the decomposed product or reaction product on the surfaces of substrates. And substances which constitute the solid catalysts to be employed in the novel process should not be of those which when heated and vaporized deteriorate the electric insulation ability of the surfaces of substrates on which films are to be formed or previously formed films on the substrates and when contained in the film as impurities have an electric charge.

Materials suitably employed as the solid catalysts in the novel process include metals such as platinum, palladium, reduced nickel, cobalt, titanium, molybdenum, vanadium and tantalum; metallic alloys such as aluminum-nickel, stainless steel and platinum-silicon; and oxide compounds comprising those of the above-mentioned metals and alumina or silica gel. The above-mentioned catalyst materials are employed in their granular, reticular or spongy form. However, low melting point substances which excessively accelerate the absorption speed of reactive gases into the catalysts and those which contain metal alkali metal such as sodium which is easily vaporized from the catalyst materials should not be used. Examples of such undesirable catalyst materials are copper and tungsten.

Experiments have shown that the catalysts would be noticeably deteriorated at temperatures over the temperature at which reactive gases are decomposed or begin to electrically combine with the catalysts. The amount and density of catalysts may be determined depending upon the effective contact area of the reactive gases and catalysts and may be adjusted as necessary or desired.

One embodiment of the first aspect of the present invention will now be described referring to the accompanying drawings. In carrying out the first aspect of the novel invention, substrates or elements on the surfaces of which films are to be formed may be formed from single crystal substances such as silicon, germanium, sapphire and gallium-arsenic, ceramics and amorphous silicon oxide film. However, description will be made of an instance in which silicon substrates or substrates of single crystal are employed and in these types of substrates it is known that the electrical bonding ability of formed films with respect to the surfaces of the substrates on which such films are formed can be easily determined.

EXAMPLE 1

The horizontal type reaction system as shown in FIG. 1A was employed and substrates 1 (5 × 5 mm.$^2$) having cleaned surfaces which had been previously prepared were set on the top of a sample holder 2 (20 × 60 mm.$^2$) by means of pins. The sample holder 2 having the substrates 1 set thereto and a metallic reticular catalyst 3 (a platinum, stainless steel or molybdenum net of 250 – 80 mesh, for example) was placed into a horizontal reaction tube 4 and the sample holder 2 was covered by the reticular metallic catalyst 3 with a distance of 1 mm. – 10 cm. apart from the upper surface of the holder 2. Then a flow of non-reactive gas was fed into the reaction tube system 4 in the direction of the arrow 6 from a suitable supply source as as bottled nitrogen or argon (not shown) to fill the interior of the tube 4 with the non-reactive gas so as not to permit any oxidizing vapor, oxygen to remain within the system 4. Thereafter, the temperature of a heating furnace 5 which surrounds the reaction tube 4 at the area where the sample holder 2 and catalyst 3 are positioned is raised to a temperature selected in the range of 550° – 1,100°C. When the heating furnace 5 is in the form of a resistance furnace, the substrates 1 and metallic reticular catalyst 3 are heated by radiant heat, but if the heating furnace is in the form of a high frequency heating furnace the substrates 1 and catalysts 3 will become the heating supply. In the latter case, as the temperature of the metallic reticular catalyst 3 may become excessively high, the activation of reactive gases and the subsequent decomposition or reaction can be perfectly performed only at the very area of the catalyst 3. As seen in the case of the gas phase growth of a single crystal aluminum oxide film on the surface of a silicon substrate, for example, in the gas growth of a multi-atom molecule, reactive gases are caused to react with each other at the very area of the metallic reticular catalyst to provide aluminum oxide which will be advantageously deposited onto the surface of the silicon substrate to form a multi-atom molecule crystal film.

After the metallic reticular catalyst 3 within the reaction tube 4 has been raised to a temperature in the range of 550° – 1,100°C, a flow of gas mixture comprising ammonia and monosilane in the ratio of 10 : 1 – 300 : 1 by volume are introduced into the reaction tube 4 at one end in the arrow direction 6 (by a bottled carrier gas supply such as Ar or $N_2$ (not shown) connected to the tube end). The thus introduced gases are activated, decomposed and caused to react with each other at the area of the metallic reticular catalyst 3 so as to synthesize silicon nitride and thereafter, the reaction product or silicon nitride is deposited on the surface of the substrates 1 to form a film thereon.

By the procedure mentioned just above, a relatively soft (the reacted species do not tightly bind with each other) silicon nitride film can be formed and therefore, the etching rate with hydrofluoric acid (concentration of 48 percent) may reach about 1,000 A./min., but since the metallic reticular catalyst 3 is also heated to substantially the same high temperature as that to which the sample substrates 1 are heated (550° – 1,100°C.), the catalyzation action of the catalyst 3 will be adversely affected.

Figure 1B:
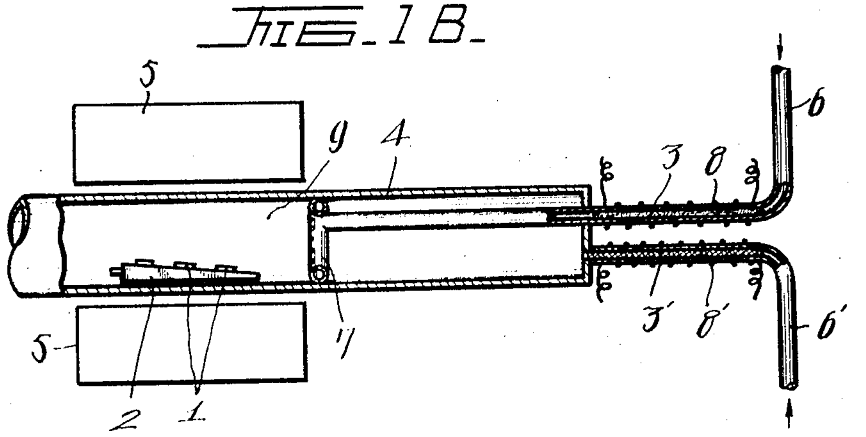
FIG. 1B illustrates another embodiment in which the process was carried out with the catalysts disposed in said system at a distance of 10 cm. – 1 m. from the substrate.

In order to eliminate the above difficulty, it is advantageous to position the catalyst at an area within the reaction system which is sufficiently remote from the heating furnace and adjacent to the inlet end of the reaction system and the area where the catalyst is positioned is heated at a temperature within the range from room temperature to 550°C. and simultaneously the substrates are also heated. In other words, the pre-heating and main heating temperature are set to utilize independently. An experiment was conducted using a horizontal reaction tube or system as shown in FIG. 1B.

A catalyst 3 is formed of platinum or nickel oxide in particulate form and another catalyst 3' is formed of platinum in reticular form of 80 mesh and having 25 pieces of 10 $mm^2$. The two catalysts 3 and 3' are respectively disposed in separate conduits 6 and 6' which are in turn connected to the reaction tube 4 at one or the fore end thereof. Separate heaters 8 and 8' are respectively disposed around the two conduits 6 and 6' and the heaters are adapted to heat the catalyst 3 from room temperature to 100°C. and to heat the catalyst 3' from room temperature to 550°C. respectively. On the other hand, a flow of ammonia gas carried by a carrier gas is fed into the conduit 6 from a bomb (not shown) and another flow of monosilane gas carried by a carrier gas is fed into the other conduit 6' from a bomb (not shown). The thus fed two flows of reactive gases are passed through the areas where the catalysts 3 and 3' are disposed while being activated by the catalysts. The activated ammonia gas is spouted from a ring-shape nozzle 7 formed at the tip end of the conduit 6 extending into the reaction tube 4 by a substantial distance to the area shown by numeral 9 within the reaction tube 4 where the sample holder 2 having the substrates 1 secured thereto is disposed and heated by the heating furnace 5 disposed around the reaction tube 2 at the particular area while the activated monosilane gas carried by the carrier gas is spouted toward the fore end of the reaction tube 4. Therefore, the gas-carried monosilane is decomposed and caused to react with the ammonia gas and the decomposed and reaction product is deposited on the substrates 1 on the sample holder 2.

In this procedure, by increasing or decreasing the flow rates of the carrier gases and/or varying the distance between the nozzle 7 and sample holder 2, the degrees of the decomposition and reaction can be varied thereby to form silicon nitride film having the desired properties.

Figure 2:
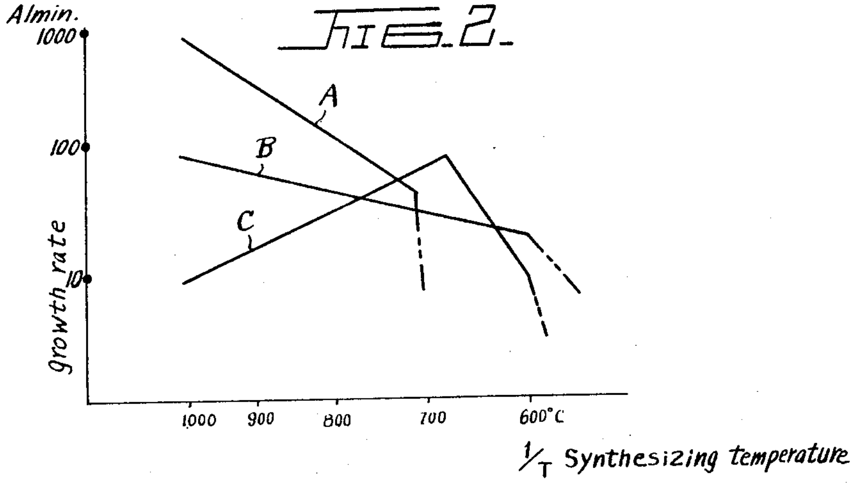
FIG. 2 is a graph showing the relationship between the growth rate of a film formed by the first embodiment of the process as shown in FIG. 1A and the heating temperature employed therein.

FIG. 2 illustrates the relationship between the growth rate of a film and synthesis temperature when a silicon nitride film was formed on the surface of a substrate using the flow rate of 50 cc./min. for ammonia gas, that of 1 cc./min. for monosilane gas and that of 1.5 l./min. for argon gas as the carrier gas. By the conventional silicon nitride film forming process which does not use any catalyst, as shown by the curve A in FIG. 2, the curve will become a linear one as expressed by the Arrhenius' equation and within the temperature range of 600° – 1,000°C. the activation energy (as counted by the gradient of the linear curve of FIG. 2) was 20 Kcal./mol. However, when the catalyst was employed at the areas of the heaters for preheating were employed, the relationship between the growth rate of the film and synthetic temperature employed would become as shown with the curve B in FIG. 2 and the activation energy was 5 Kcal./mol. And when the catalyst mass was increased to threefold (the mass of the catalyst to be employed may vary depending upon the flow rates of the reactive gases and in the experiment which obtained the result as shown with the curve B in FIG. 2, the platinum reticule of 80 mesh was used by the aggregate 25 $cm.^2$ while in the experiment which resulted in the curve C of FIG. 2, the platinum reticule of the same mesh was used by the aggregate 75 $cm.^2$), the obtained activation energy was apparently negative. The same result may be obtained even when the temperature for the preheating was changed within the range of room temperature – 550°C. When reduced nickel is used as the catalyst, the preheating temperature is preferably within the range of room temperature – 100°C. When platinum is used as the catalyst and the pre-heating temperature exceeds 600°C., the silane is perfectly pyrolyzed and caused to adhere to the inner wall of the reaction tube. These phenomena are believed due to the fact that the hydride gas is subjected to the action of the catalyst and comes to assume a chemically active state which is the transional state from which the hydride gas proceeds to the decomposition or reaction. The chemical activity of the reactive gases varies depending upon the type and effective area of the catalyst or catalysts employed.

Figure 3:
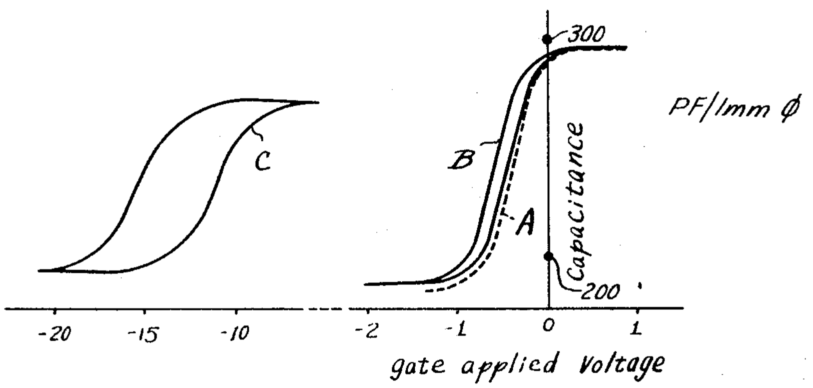
FIG. 3 and FIG. 4 are graphs showing the relationships between the condenser capacitance and gate applied voltage of MIS diodes prepared from substrates having electrically insulative films formed thereon by the gas phase - gas phase reaction process and the solid phase - gas phase reaction processes in the embodiments as shown in FIGS. 1 and 2, respectively.

FIG. 3 illustrates the relationship between the DC gate voltage added 10 mv. · 1 MHz. AC thereto and capacitance of a MIS diode for the gate of a field effect transistor (FET) which comprises metal (aluminum or titanium) - insulator (formed silicon nitride film) - semiconductor (in this case N-type, 1 ohm silicon of single crystal). As compared with the theoretical curve C for the gate applied voltage and capacitance in this figure, the curve B of the film obtained by the film forming procedure using the catalyst (in this case, the mixing ratio of ammonium to monosilane is 500 : 1 – 10 : 1; the mixing ratio of argon gas to monosilane is 1,000 : 1 – 500 : 1; the total flow rate of these mixture gases is 2 – 2.5 l./min. for 40 minutes; and the mixture gases are reacted with each other at the temperature of 900°C.) is different from the curve C of the film obtained by the film forming procedure without any use of catalyst and becomes substantially an ideal curve. In the procedure for obtaining the curve B the surface state density at the interface of $10^{10}$ – $10^{11}$/ $v.^{-1}cm.^{-2}$ is obtained and the surface state density is less than that of the curve C by 1/10 – 1/100. Both the system shown in FIG. 1A and that shown in FIG. 1B can obtain substantially the same curve, but in the case of the system of FIG. 1A which is not provided with the nozzle the surface of the synthesized silicon nitride film would become hard (the condition in which adjacent species are tightly bonded together) and therefore, the film would not firmly adhere to the substrate and almost no improvement is attained in the surface state density at the interface over the case in which no catalyst is employed. And as to the physical bonding properties, when cracks which took place at the interface between the substrate and film were examined, the non-catalyst procedure produced cracks at the thickness of 4,000 A. while the catalyst-type procedure cracks at that of about 1 $\mu$m. As a result, it has been found that the catalyst or catalysts can reduce the residual stress of a synthesized film which manifests the physical bonding ability of the film.

In the above mentioned Example 1, descriptions have been made of instances in which silicon nitride films are formed, it will be of course understood that the gas phase - gas phase reaction for synthesizing other films such as silicon oxide films and aluminum oxide films will produce similar results. Since the silicon oxide film has a very loose bonding (the spaces within each one molecule is large and the film has a high elasticity), the film has a lesser strain and no crack will develop at the interface, but the synthetic of such a film can be made at temperatures less than those employed in the catalyst-type film forming procedure and the surface state density at the interface is low, because the density of dangling bonds of silicon decreases due to the presence of catalysts.

The above mentioned Example 1 is a typical embodiment of the gas phase - gas phase reaction which is the first aspect of the present invention, but the embodiment also constitutes a portion of the second aspect of the present invention, one example of which will be discussed hereinbelow.

EXAMPLE 2

As one example for forming a film by the solid phase - gas phase reaction, a reaction between a stain film and ammonia will be discussed hereinbelow.

After the surface of a selected silicon substrate or element has been cleaned by chemical etching, the substrate surface is rinsed with acetone or isopropyl alcohol. Thereafter, the substrate is immersed in a boiling nitric acid for about 10 minutes, or immersed in nitric acid at room temperature and the solution is then boiled for about 10 minutes thereby to render the substrate or element hydrophilic. The thus treated substrate or element is held in a staining reaction tube for 5 seconds – 10 minutes.

The stain film may be formed by either the gas phase process or liquid phase process, but one example of the gas phase process will be illustrated hereinbelow.

By either the process in which hydrofluoric acid is bubbled by a non-reactive gas such as argon or by the process in which bottled hydrogen fluoride and argon are utilized, a mixture gas comprising hydrogen fluoride and argon in the ratio of 1 : 1 – 1 : 100 by volume (usually the ratio of 1 : 10) is prepared. The small quantity of nitrogen oxide is added to the prepared mixture gas in the ratio of 1 : 50 – 1 : 500 by volume and the resultant mixture is introduced into a reaction tube at the rate of 1 – 5 l./min. The substrate of the element pretreated in the manner mentioned above is placed and sealed in the reaction tube for about 5 seconds – 10 minutes whereby a stain film is formed on the surface of the substrate of element.

The system as shown in FIG. 1A is used and the substrate or element having a stain film formed on the surface is placed and sealed in the quartz reaction tube 4. A flow of ammonia gas is introduced into the reaction tube 4 at the rate of 150 – 500 cc./min. The temperature of the heating furnace 5 is set at a desired temperature within the range of 700° – 1,200° C. and maintained for 1/2 – 2 hrs. to nitrogenize the stain film.

The substrate or element having the silicon nitride film (stain nitride film) formed in this way on the surface was prepared into a MIS diode and the electric characteristics of the diode were determined. The result has shown that since the thickness of the film was 100 A. – 600 A., leakage current was sometimes found. However, the surface state density at the interface was on the order of $10^{10}$cm.$^{-2}$V.$^{-1}$ and the electrical fitness at the interface was satisfactory.

Figure 4:
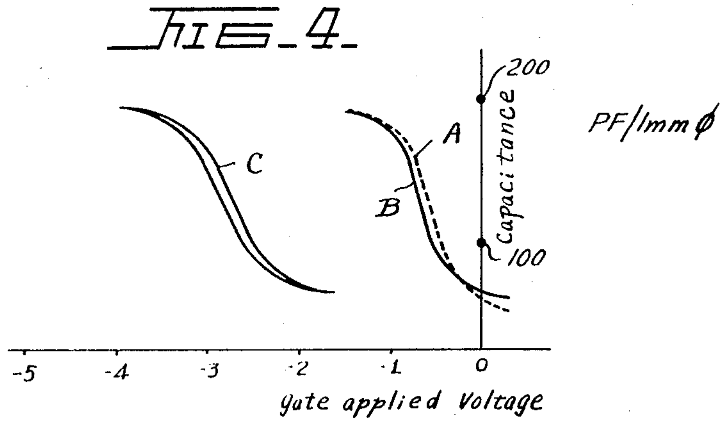

On the other hand, in order to prevent the leakage current, the stain film is nitrogenized and a silicon nitride film is formed on the surface of the stain film using the system as employed in Example 1 and by introducing a mixture gas comprising ammonia and silane in the same mixing ratio and for the same heating time of the mixture as in the case of Example 1. The electrical characteristics of the thus formed silicon nitride film were determined. The results are shown in FIG. 4. In this Example, the substrate employed was a P-type 10 ohm-cm. silicon substrate of single crystal.

In FIG. 4, the curve A is a theoretical curve for capacitance and gate applied DC voltage, the curve B for capacitance and gate applied DC voltage obtained by the catalyst-type process and the curve C for capacitance and gate applied DC voltage obtained by the non-catalyst-type process. As clear from this Figure, the electrical bonding ability of the silicon nitride film formed by the catalyst-type process was remarkably superior to those of the silicon nitride film formed by the non-catalyst-type process which were quite unsatisfactory. The unsatisfactory electrical bonding ability of the silicon nitride film obtained by the non-catalyst-type process is due to the fact that the film contains undecomposed or unreacted ingredients therein and the unsatisfactory electrical bonding ability of the silicon film formed by the non-catalyst process described in connection with Example 1 as shown in FIG. 2 are also due to the same reason.

And when a silicon oxide film is formed by the utilization of oxygen, vapor or hydrogen peroxide, for example in place of ammonia in the process of Example 2, a thin silicon oxide film is formed by oxidizing the surface of a silicon substrate, the catalyzing action of the catalyst can improve the electrical bonding connecting ability of the formed film.

The electric insulating films formed by the gas phase - gas phase reaction and the solid phase - gas phase reaction are mostly applicable to surface protections of substrates or elements or as gate portions of MIS-type filed effective transistors.

EXAMPLE 3

One example of the gas phase growth process will be described hereinbelow.

When silicon is epitaxially grown, silicon of a single crystal or sapphire is mostly employed as the substrate. In this example, silicon (having the crystal orientation of <1 - 1 - 1>) is used as the substrate. The system used is the same as shown in FIG. 1B with the elimination of the ring-shape nozzle 5 of the conduit 3. In operation, hydrogen chloride gas (99.99 percent vapor) is introduced into the reaction tube 4 by means of a carrier gas such as argon or hydrogen so as to gas-etch the surface of the substrate to a depth of 1 – 5 $\mu$m. The temperature of the heating furnace 5 is maintained within the range of 1,000° – 1,050°C. whereby the lower temperature limit to which the etching is feasible can be reduced by about 100°C. as compared with the lower temperature limit feasible by the conventional non-catalyst process. In this case, nickel or tantalum is employed as the material for the catalyst because platinum easily combines with hydrogen chloride and is unsuitable.

After the substrate surface has been gas-etched in the manner mentioned above, the temperature of the heating furnace is set at a desired temperature and then monosilane which has been diluted by a carrier gas such as nitrogen or argon gas in the dilution degree within the range 1 : 100 – 1 : 1,000 is introduced into the reaction tube 4 thereby to epitaxially grow a film having the same crystal orientation as the substrate. The activation energy to prepare the film is lower than that of the film prepared by the non-catalyst process and in addition, the film formed by the catalyst-type process has an improved physical fitness with respect to the substrate on which the film was formed. A microscopic test has found that the obtained film has less lattice defects and the yielding rate is 95 percent.

As is clear from this Example, as compared with the case in which reactive gases are decomposed on the surface of a substrate or element on which a film is to be formed as followed by the gas phase reaction, by activating reactive gases by means of a catalyst at a distance somewhat apart from the substrate surface, decomposing the activated gases and causing the decomposed product to grow on the substrate surface, a film having more excellent properties can be obtained. In addition, the epitaxial growth of gallium-arsenide on the surface of a semiconductor comprising gallium-arsenide may be carried out as described above and the same result may be obtained.

And after a film has been formed by epitaxial growth as described in Example 3, by partially dispersing P-type or N-type impurities from the formed film, the film can be prepared into an active element such as a transistor or diode and the thus formed film has a wide variety of applications.

As is clear from the descriptions given in Examples 1 through 3 referred to hereinabove, the principle underlying the first aspect of the present invention is characterized in that in forming a film on the surface of a substrate or element the stage for activating reactive gases by the action of a catalyst at a distance of 1 mm. – 1 m. apart from the surface of the substrate and decomposing or reacting a suitable degree and the stage for depositing the decomposed or reaction product on the substrate surface so as to form a film thereon are individually and separately performed. By the separation of the two films forming stages from each other, it is possible to improve the physical properties and electrical fitness of the film deposited on the surface and to improve the electrical properties of the thus formed film by the elimination of undecomposed or unreacted species, of the dangling bonds and cluster in the film. Furthermore, the lower limit for the possible film forming temperature can be further lowered.

The basic principle underlying the second aspect of the present invention is that when a film is formed on the surface of a solid substrate or element, hydride gases containing silicide, nitride and oxide reactive gases as employed in the above-mentioned first aspect of the invention are reacted by means of a catalyst formed of platinum or the like so as to activate the reactive gases and simultaneously the activated reactive gases are substantially surrounded by an inactive gas, the activated gases are maintained in their unstable state for a predetermined time period so as to decompose or react the active gases. As the result, a decomposed or reaction product can be synthesized at a temperature lower than those at which such films have hitherto been produced. Therefore, it is believed that the present invention can greatly contribute to the development of solid state electronics and electronic industry.

Although the best mode contemplated for carrying out the present invention has been herein shown and described, it will be apparent that modification and variation may be made without departing from what is regarded to be the subject matter of the invention as set forth in the appended claims.

What is claimed is:

1. A process for forming a silicon nitride or silicon oxide film on the surface of a substrate comprising the steps of:

a. placing a catalyst at a distance of 1 mm.–1 m. from said substrate surface, said catalyst being a member of the group consisting of platinum, palladium, reduced nickel, cobalt, titanium, vanadium, molybdenum, tantalum, aluminum-nickel alloys, stainless steel, platinum-silicon alloy, oxides thereof, alumina, silica gel and mixtures thereof;

b. chemically activating reactive gases in the presence of said catalyst, said reactive gases containing a hydride, a source of silicon, and a source of a member of the group consisting of nitride and oxide, whereby a portion or all of said reactive gases is reacted or decomposed so as to provide silicon oxide or silicon nitride; and c. depositing the reaction product on said surface of said substrate as a film.

2. A process as set forth in claim 1, in which said substrate is formed of a member selected from the group consisting of silicon, germanium, sapphire, gallium-arsenide, ceramics and amorphous silicon oxide or nitride film.

3. A process as set forth in claim 1 wherein said catalyst is in particulate form or in the form of a reticulum.

4. A process as set forth in claim 1 wherein the catalyst is positioned at a distance of 1 mm. – 10 cm. from the surface of the substrate on which the film is to be formed.

5. A process according to claim 1 wherein said catalyst is platinum.

6. A process as set forth in claim 1 wherein said reactive gases include a member of the group consisting of monosilane, trichlorosilane and silicon tetrachloride, and a member of the group consisting of ammonia and hydrazine, whereby a silicon nitride film is formed.

7. A process according to claim 1 wherein said reactive gases include a member of the group consisting of monosilane, trichlorosilane and silicon tetrachloride, and a member of the group consisting of wet oxygen, hydrogen peroxide and nitrogen peroxide, whereby a silicon dioxide film will be formed.

8. A process according to claim 1 wherein said step of chemically activating reactive gases involves a solid phase - gas phase reaction between a silicide of a stain film on a silicon substrate and a member of the group consisting of ammonia and hydrazine, whereby a silicon nitride film will be formed.

9. A process according to claim 1 wherein said step of chemically activating reactive gases involves a solid phase - gas phase reaction between a silicide of a stain film on a silicon substrate and a member of the group consisting of oxygen, wet oxygen, water vapor and hydrogen peroxide, whereby a silicon dioxide film will be formed.

10. A process according to claim 1 wherein said reactive gas includes monosilane, whereby a silicon crystal growth film will be formed.

* * * * *